(12) United States Patent
Nagasaki

(10) Patent No.: US 11,249,699 B2
(45) Date of Patent: Feb. 15, 2022

(54) SERVER, NON-TRANSITORY COMPUTER-READABLE RECORDING MEDIUM STORING COMPUTER-READABLE INSTRUCTIONS FOR SERVER, METHOD PERFORMED BY SERVER, AND PRINTER

(71) Applicant: BROTHER KOGYO KABUSHIKI KAISHA, Nagoya (JP)

(72) Inventor: Takeshi Nagasaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/162,113

(22) Filed: Jan. 29, 2021

(65) Prior Publication Data

US 2021/0240401 A1 Aug. 5, 2021

(30) Foreign Application Priority Data

Jan. 31, 2020 (JP) .............................. JP2020-015043

(51) Int. Cl.
*G06F 15/00* (2006.01)
*G06F 3/12* (2006.01)
*G06K 1/00* (2006.01)

(52) U.S. Cl.
CPC ............ *G06F 3/121* (2013.01); *G06F 3/1204* (2013.01); *G06F 3/1224* (2013.01); *G06F 3/1229* (2013.01)

(58) Field of Classification Search
CPC ...... G06F 3/121; G06F 3/1204; G06F 3/1224; G06F 3/1229
USPC ............................ 358/1.15, 1.14, 1.13, 1.1
See application file for complete search history.

(56) References Cited

U.S. PATENT DOCUMENTS

| | | | |
|---|---|---|---|
| 2009/0310166 A1* | 12/2009 | Kanemitsu | ............ G06F 21/608 358/1.15 |
| 2012/0250080 A1* | 10/2012 | Ohtake | ................. G06F 3/1259 358/1.15 |
| 2016/0292772 A1* | 10/2016 | Nagasaki | ........... G06K 15/4075 |
| 2017/0118574 A1* | 4/2017 | Park | ........................ H04L 67/02 |

FOREIGN PATENT DOCUMENTS

| | | |
|---|---|---|
| JP | 2005-136595 A | 5/2005 |
| JP | 2006-195241 A | 7/2006 |

* cited by examiner

*Primary Examiner* — Douglas Q Tran
(74) *Attorney, Agent, or Firm* — Merchant & Gould P.C.

(57) ABSTRACT

A sever configured to execute communication with a printer may include a controller. The controller may be configured to: in a case where a first predetermined condition is satisfied, execute a first delivering process for delivering a new first consumable article to a user of the printer; and in a case where the first delivering process is executed, send an initialization instruction to the printer, wherein the initialization instruction is a command instructing the printer to initialize first count information, wherein the first count information is stored in the printer and related to a used amount of a first consumable article.

20 Claims, 9 Drawing Sheets

SERVER, NON-TRANSITORY COMPUTER-READABLE RECORDING MEDIUM STORING COMPUTER-READABLE INSTRUCTIONS FOR SERVER, METHOD PERFORMED BY SERVER, AND PRINTER

CROSS-REFERENCE TO RELATED APPLICATION

This application claims priority to Japanese Patent Application No. 2020-015043, filed on Jan. 31, 2020, the entire contents of which are incorporated herein by reference.

TECHNICAL FIELD

The disclosure herein discloses art related to a server configured to execute a delivering process for delivering a consumable article of a printer.

BACKGROUND ART

A system including a central management device and a multi-function device is known. In this system, a replacement worksheet is used. The replacement worksheet includes checkboxes for respective components that require replacement in a printer. A worker checks the checkboxes corresponding to replaced components and causes the multi-function device to read the replacement worksheet. The multi-function device determines whether each checkbox is checked or not and sends information indicating the determination result to the central management device. Based on this information, the central management device sends a signal for resetting counters corresponding to the replaced components to the printer.

SUMMARY

The disclosure herein discloses art for initializing count information that is related to a used amount of a consumable article of a printer and is stored in the printer, by using a novel method different from the above-described technique.

A sever configured to execute communication with a printer is disclosed herein. The server may comprise a controller. The controller may be configured to: in a case where a first predetermined condition is satisfied, execute a first delivering process for delivering a new first consumable article to a user of the printer; and in a case where the first delivering process is executed, send an initialization instruction to the printer, wherein the initialization instruction is a command instructing the printer to initialize first count information, wherein the first count information is stored in the printer and related to a used amount of a first consumable article.

A printer configured to execute communication with a server is disclosed herein. The printer may comprise: a memory storing first count information related to a used amount of a first consumable article of the printer, and a controller. The controller may be configured to: in a case where a first delivering process is executed by the server, receive an initialization instruction instructing initialization of the first count information from the server, wherein in the server, the first delivering process for delivering a new first consumable article to a user of the printer is executed in a case where a first predetermined condition is satisfied; and in a case where the initialization instruction is received from the server, initialize the first count information in the memory.

A computer program for realizing the above server, a computer-readable storage medium storing this computer program, and a method carried out by the above server are also novel and useful. A computer program for realizing the above printer, a computer-readable storage medium storing this computer program, and a method carried out by the above printer are also novel and useful. Further, a system comprising the above server and the above printer is also novel and useful.

BRIEF DESCRIPTION OF THE DRAWINGS

EMBODIMENT (Configuration of Communication System 2: FIG. 1)

As shown in FIG. 1, a communication system 2 is provided with a plurality of printers 10, 50, a management server 100, and a delivery server 200. The printers 10, 50 and servers 100, 200 are communicable with each other via the Internet 4.

Figure 1:
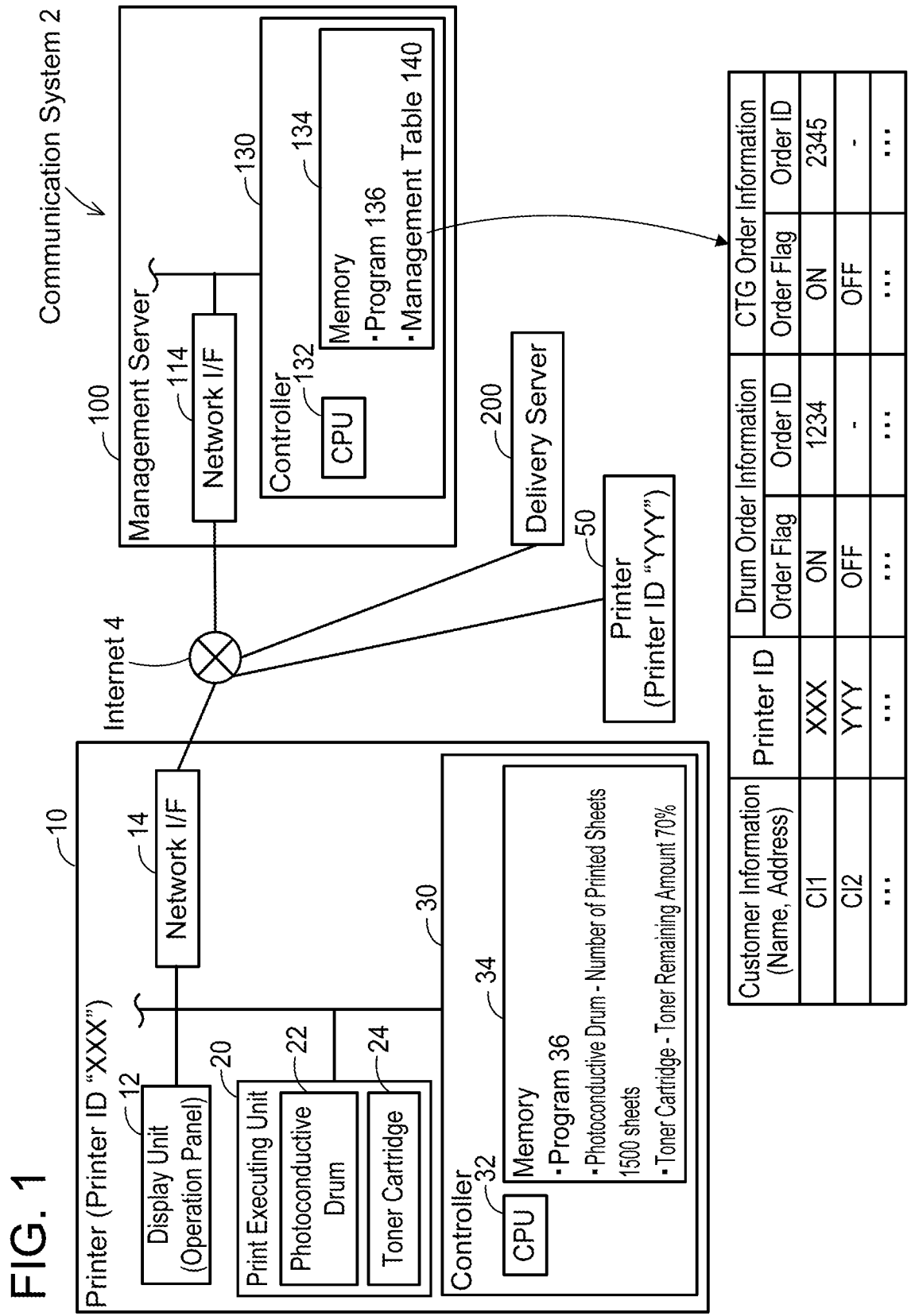
FIG. 1 shows a configuration of a communication system.

Especially between each of the printers 10, 50 and the management server 100, Extensible Messaging and Presence Protocol (XMPP) connections, which are so-called full-time connections, are established. Due to this, the management server 100 can send signals to the printers 10, 50 beyond a firewall of a local area network to which each of the printers 10, 50 belongs, without receiving signals from the printers 10, 50.

(Configurations of Printers 10, 50)

Each of the printers 10, 50 is a peripheral device configured to execute a print function. A printer ID of the printer 10 is "XXX", and a printer ID of the printer 50 is "YYY". The printer IDs are each identification information for identifying the printer. Since the printers 10, 50 have similar configurations, only the configuration of the printer 10 will be described hereinbelow and explanation on the configuration of the printer 50 will be omitted. The printer 10 is provided with a display unit 12, a network interface 14, a print executing unit 20, and a controller 30.

The display unit 12 is a display for displaying various types of information. The display unit 12 also functions as an operation panel (i.e., an operation unit) configured to accept instructions from a user. An operation unit may be provided as a separate unit from the display unit 12. The network interface 14 is connected to the Internet 4 via the local area network.

The print executing unit 20 is a printing mechanism configured to execute printing according to a laser scheme. The print executing unit 20 is provided with a photoconductive drum 22 and a toner cartridge 24. The photoconductive drum 22 is configured to be exposed by laser and hold a toner and is detachably attached to a housing (not shown) of the printer 10. The toner cartridge 24 is configured to store the toner and is detachably attached to the housing of the printer 10. When a number of sheets printed by using the photoconductive drum 22 becomes equal to or greater than a threshold, a new photoconductive drum needs to be attached as a replacement for the photoconductive drum 22. Further, when a remaining amount of the toner in the toner cartridge 24 becomes equal to or less than a threshold, a new toner cartridge needs to be attached as a replacement for the toner cartridge 24. That is, the photoconductive drum and the toner cartridge are consumable articles of the printer 10. Hereinbelow, the photoconductive drum and the toner cartridge are respectively termed "drum" and "CTG (cartridge)" in a simplified manner.

The controller 30 is provided with a CPU 32 and a memory 34. The CPU 32 is configured to execute various processes according to a program 36 stored in the memory 34. The memory 34 is configured of a volatile memory, a nonvolatile memory, and the like. The memory 34 stores, in addition to the aforementioned program 36, a number of printed sheets (which is 1500 sheets in the example of FIG. 1) and a toner remaining amount (which is 70% in the example of FIG. 1). The number of printed sheets is information indicating the number of sheets printed by using the drum 22 and is counted up each time printing is executed. Hereinbelow, this number of printed sheets will be termed "drum print number". Normally, the drum print number is initialized (i.e., the count is set to zero) each time the drum 22 is replaced. The toner remaining amount is information expressing the remaining amount of the toner in the CTG 24 in percentage and is counted down each time printing is executed.

(Configuration of Management Server 100)

The management server 100 is configured to execute a delivering process for delivering a new consumable article when a timing to replace a consumable article (e.g., drum 22, CTG 24) of a printer (e.g., 10, 50) has arrived. Specifically, the management server 100 is configured to order delivery of a new consumable article to the delivery server 200. The management server 100 is installed on the Internet 4 by a vendor of the printers 10, 50. In a variant, the management server 100 may be installed by an entity different from the vendor. The management server 100 is provided with a network interface 114 and a controller 130.

The network interface 114 is connected to the Internet 4. The controller 130 is provided with a CPU 132 and a memory 134. The CPU 132 is configured to execute various processes according to a program 136 stored in the memory 134. The memory 134 is configured of a volatile memory, a nonvolatile memory, and the like. The memory 134 stores a management table 140, in addition to the aforementioned program 136. The management table 140 is a table in which customer information, a printer ID, drum order information, and CTG order information are stored in association with each other.

The customer information is information such as a name, an address, etc. of an owner of a printer. As aforementioned, the printer ID is identification information for identifying a printer. The drum order information includes an order flag and an order ID. The CTG order information also includes an order flag and an order ID. The order flag is set at a value that is either one of ON, indicating a state between when an order of a new consumable article (e.g., drum, CTG) was requested to the delivery server 200 and when the delivery of this consumable article is completed, or OFF, indicating a state other than the aforementioned state. The order ID is information for identifying an order of a new consumable article and is generated by the delivery server 200.

(Configuration of Delivery Server 200)

The delivery server 200 is configured for delivery of a consumable article (e.g., drum 22, CTG 24) of a printer (e.g., 10, 50) to a user of the printer according to a request from the management server 100. Specifically, when receiving order information that includes information indicating the address, name, etc. of a user and information indicating the type of consumable article from the management server 100, the delivery server 200 instructs a worker to deliver the consumable article. The delivery server 200 is installed on the Internet 4 by an entity different from the vendor of the printers 10, 50. In a variant, the delivery server 200 may be installed by the vendor.

Figure 2:
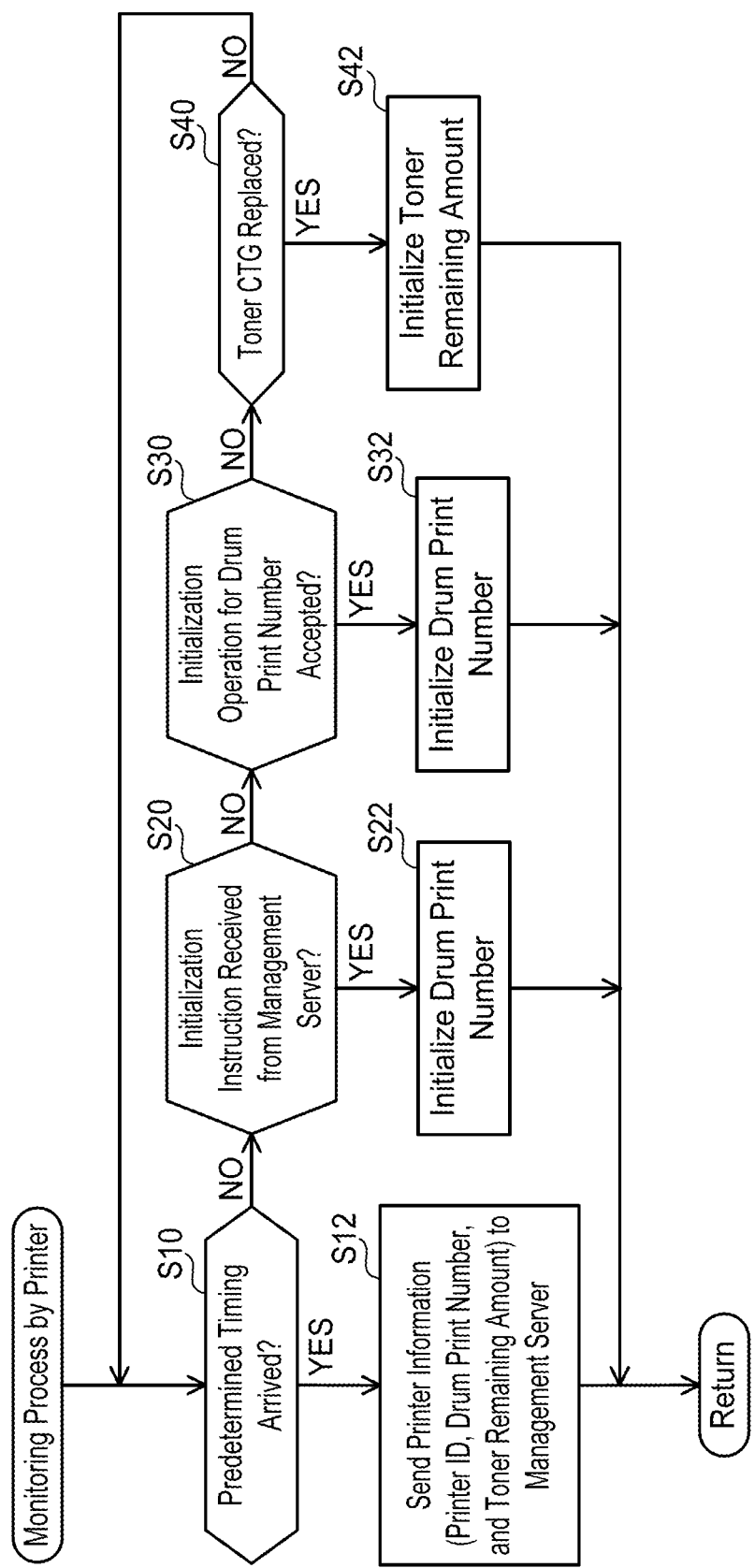
FIG. 2 shows a flowchart of a monitoring process by a printer.

(Monitoring Process by Printer 10: FIG. 2)

Next, a monitoring process executed by the CPU 32 of the printer 10 will be described with reference to FIG. 2. The printer 50 also executes the process of FIG. 2 (as well as that of FIG. 3), similar to the printer 10. All communication executed by the printer 10 is executed via the network interface 14. Thus, for explanation on the communication, a phrase "via the network interface 14" will be omitted. The CPU 32 executes monitoring processes of S10, S20, S30, and S40 in parallel.

In S10, the CPU 32 monitors arrival of a predetermined timing. The predetermined timing may, for example, be a certain time of a day. The CPU 32 proceeds to S12 in a case of determining that the predetermined timing has arrived (YES in S10).

In S12, the CPU 32 sends printer information to the management server 100. The printer information includes the printer ID "XXX", the drum print number in the memory 34, and the toner remaining amount in the memory 34. When S12 is completed, the CPU 32 returns to the monitoring process of S10, etc.

In S20, the CPU 32 monitors receipt of an initialization instruction from the management server 100. The initialization instruction is a command instructing initialization of the drum print number in the memory 34. The CPU 32 proceeds to S22 in a case of determining that the initialization instruction is received from the management server 100 (YES in S20).

In S22, the CPU 32 initializes the drum print number (i.e., sets the count value to zero) in the memory 34. When S22 is completed, the CPU 32 returns to the monitoring process of S10, etc.

In S30, the CPU 32 monitors acceptance of an initialization operation for the drum print number. The CPU 32 determines that the initialization operation was accepted (YES in S30) in a case of obtaining a signal indicating that the initialization operation was performed from the operation panel in response to the operation panel of the display unit 12 having been operated by the user, and proceeds to S32.

In S32, the CPU 32 initializes the drum print number in the memory 34, similar to S22. When S32 is completed, the CPU 32 returns to the monitoring process of S10, etc.

In S40, the CPU 32 monitors replacement of the CTG. The CPU 32 determines that the CTG has been replaced (YES in S40) in a case of obtaining a signal indicating that the CTG has been replaced from the print executing unit 20, and proceeds to S42.

In S42, the CPU 32 initializes the toner remaining amount (i.e., resets the count value to 100%) in the memory 34. When S42 is completed, the CPU 32 returns to the monitoring process of S10, etc. As above, the printer 10 can automatically initialize the toner remaining amount when a new CTG has been attached. That is, the CTG is a consumable article of which attachment to the printer 10 causes the printer 10 to automatically initialize the toner remaining amount.

On the other hand, there is no processes for monitoring replacement of the drum and initializing the drum print number in FIG. 2. Thus, the printer 10 does not automatically initialize the drum print number even when a new drum has been attached. That is, the drum is a consumable article of which attachment to the printer 10 does not cause the printer 10 to automatically initialize the drum print number. Due to this, a sensor for detecting the drum replacement does not need to be provided, for example, and manufacturing cost of the printer 10 can thereby be reduced.

Figure 3:
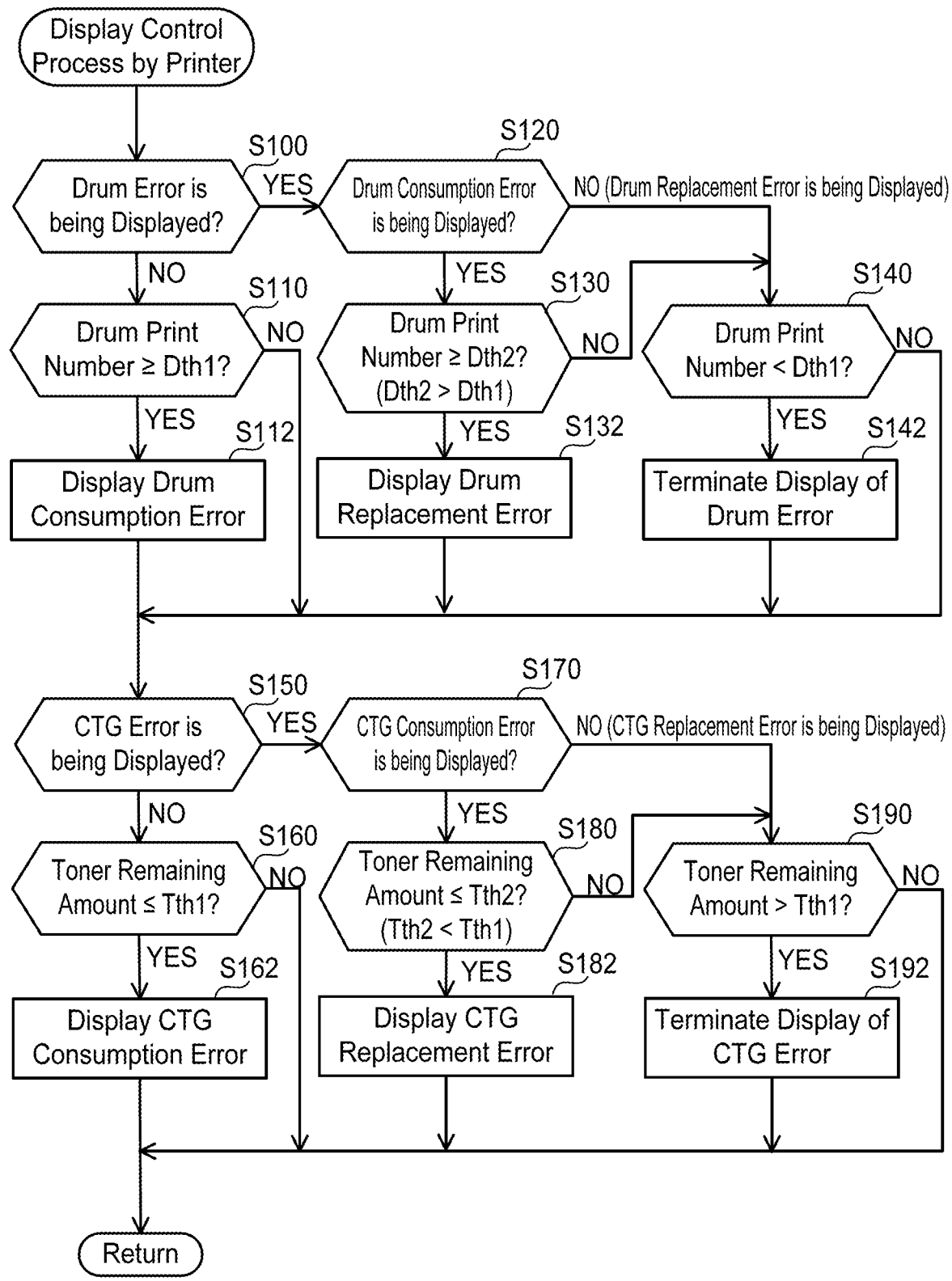
FIG. 3 shows a flowchart of a display control process by the printer.

(Display Control Process by Printer 10: FIG. 3)

Next, a display control process executed by the CPU 32 of the printer 10 will be described with reference to FIG. 3. In this process, the CPU 32 executes a process (S100 to S142) for displaying an error related to drum replacement (hereinbelow termed "drum error") and a process (S150 to S192) for displaying an error related to CTG replacement (hereinbelow termed "CTG error").

In S100, the CPU 32 determines whether or not a drum error is currently displayed on the display unit 12. Here, the drum error includes a drum consumption error and a drum replacement error. The drum consumption error is an error display including a message that a replacement time for the drum is approaching. The drum replacement error is an error display including a message that the drum is to be replaced. The CPU 32 proceeds to S120 in a case of determining that one of the drum consumption error and the drum replacement error is displayed (YES in S100), while it proceeds to S110 in a case of determining that neither of these errors is displayed (NO in S100).

In S110, the CPU 32 determines whether or not the drum print number in the memory 34 is no less than a preset threshold Dth1 (e.g., 18,000 sheets). The CPU 32 proceeds to S112 in a case of determining that the drum print number is equal to or greater than the threshold Dth1 (YES in S110), while it proceeds to S150 in a case of determining that the drum print number is less than the threshold Dth1 (NO in S110).

In S112, the CPU 32 causes the display unit 12 to display the drum consumption error by instructing the display unit 12 to display the drum consumption error. When S112 is completed, the CPU 32 proceeds to S150.

In S120, the CPU 32 determines whether or not the drum consumption error is currently displayed on the display unit 12. The CPU 32 proceeds to S130 in a case of determining that the drum consumption error is displayed (YES in S120), while it proceeds to S140 in a case of determining that the drum replacement error is displayed (NO in S120).

In S130, the CPU 32 determines whether or not the drum print number in the memory 34 is no less than a preset threshold Dth2 (e.g., 20,000 sheets). Here, the threshold Dth2 (e.g., 20,000 sheets) is greater than the threshold Dth1 (e.g., 18,000 sheets). The CPU 32 proceeds to S132 in a case of determining that the drum print number is equal to or greater than the threshold Dth2 (YES in S130), while it proceeds to S140 in a case of determining that the drum print number is less than the threshold Dth2 (NO in S130).

In S132, the CPU 32 causes the display unit 12 to display the drum replacement error instead of the drum consumption error by instructing the display unit 12 to display the drum replacement error. When S132 is completed, the CPU 32 proceeds to S150.

In S140, the CPU 32 determines whether or not the drum print number in the memory 34 is less than the threshold Dth1. That is, the CPU 32 determines whether or not the drum print number has changed from being equal to or greater than the threshold Dth1 to being less than the threshold Dth1. This change is caused by the drum print number being initialized in S22 or S32 of FIG. 2. The CPU 32 proceeds to S142 in a case of determining that the drum print number is less than the threshold Dth1 (YES in S140), while it proceeds to S150 in a case of determining that the drum print number is equal to or greater than the threshold Dth1 (NO in S140).

In S142, the CPU 32 terminates the display of the drum error (i.e., drum consumption error or drum replacement error) by instructing the display unit 12 to terminate the display of the drum error. When S142 is completed, the CPU 32 proceeds to S150.

In S150, the CPU 32 determines whether or not a CTG error is currently displayed on the display unit 12. Here, the CTG error includes a CTG consumption error and a CTG replacement error. The CTG consumption error is an error display including a message that a replacement time for the CTG is approaching. The CTG replacement error is an error display including a message that the CTG is to be replaced. The CPU 32 proceeds to S160 in a case of determining that one of the CTG consumption error and the CTG replacement error is displayed (NO in S150), while it proceeds to S170 in a case of determining that neither of these errors is displayed (YES in S150).

In S160, the CPU 32 determines whether or not the toner remaining amount in the memory 34 is no greater than a preset threshold Tth1 (e.g., 10%). Here, determining whether the toner remaining amount is no greater than the threshold Tth1 is equivalent to determining whether a used amount of the toner is no less than (100−Tth1)%. This applies similarly to determination in S180 to be described later. The CPU 32 proceeds to S162 in a case of determining that the toner remaining amount is equal to or less than the threshold Tth1, that is, in a case of determining that the used amount of the toner is equal to or greater than (100−Tth1)% (YES in S160), while it returns to S100 in a case of determining that the toner remaining amount is greater than the threshold Tth1 (NO in S160).

In S162, the CPU 32 causes the display unit 12 to display the CTG consumption error by instructing the display unit 12 to display the CTG consumption error. When S162 is completed, the CPU 32 returns to S100.

In S170, the CPU 32 determines whether or not the CTG consumption error is currently displayed on the display unit 12. The CPU 32 proceeds to S180 in a case of determining that the CTG consumption error is displayed (YES in S170), while it proceeds to S190 in a case of determining that the CTG replacement error is displayed (NO in S170).

In S180, the CPU 32 determines whether or not the toner remaining amount in the memory 34 is no greater than a preset threshold Tth2 (e.g., 0%). Here, the threshold Tth2 (e.g., 0%) is smaller than the threshold Tth1 (e.g., 10%). The CPU 32 proceeds to S182 in a case of determining that the toner remaining amount is equal to or less than the threshold Tth2, that is, in a case of determining that the used amount of the toner is equal to or greater than (100−Tth2)% (YES in S180), while it proceeds to S190 in a case of determining that the toner remaining amount is greater than the threshold Tth2 (NO in S180).

In S182, the CPU 32 causes the display unit 12 to display the CTG replacement error instead of the CTG consumption error by instructing the display unit 12 to display the CTG replacement error. When S182 is completed, the CPU 32 returns to S100.

In S190, the CPU 32 determines whether or not the toner remaining amount in the memory 34 is greater than the threshold Tth1. That is, the CPU 32 determines whether or not the toner remaining amount has changed from being equal to or less than the threshold Tth1 to being greater than the threshold Tth1. This change is caused by the toner remaining amount being initialized in S42 of FIG. 2. The CPU 32 proceeds to S192 in a case of determining that the toner remaining amount is greater than the threshold Tth1 (YES in S190), while it returns to S100 in a case of determining that the toner remaining amount is equal to or less than the threshold Tth1 (NO in S190).

In S192, the CPU 32 terminates the display of the CTG error (i.e., CTG consumption error or CTG replacement error) by instructing the display unit 12 to terminate the display of the CTG error. When S192 is completed, the CPU 32 returns to S100.

Figure 4:
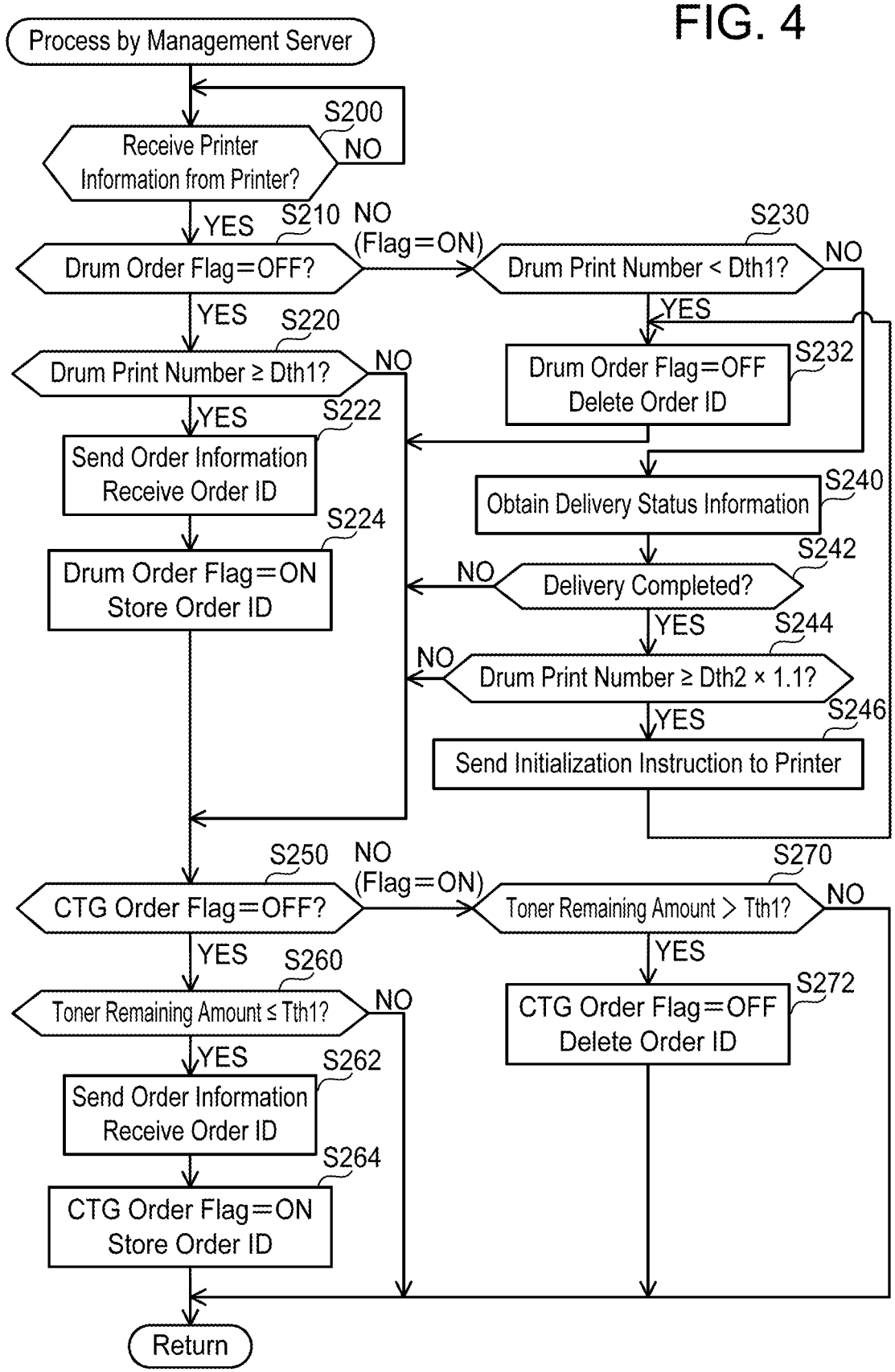
FIG. 4 shows a flowchart of a process by a management server.

(Process by Management Server 100: FIG. 4)

Next, a process executed by the CPU 132 of the management server 100 will be described with reference to FIG. 4. All communication executed by the management server 100 is executed via the network interface 114. Due to this, for explanation on the communication, a phrase "via the network interface 114" will be omitted.

In S200, the CPU 132 monitors receipt of printer information from a printer (e.g., 10, 50). The CPU 132 determines YES in S200 in a case of receiving printer information, and proceeds to S210. The printer information includes a printer ID, a drum print number, and a toner remaining amount of the sender printer. Hereinbelow, the printer information received in S200, the printer ID included in this printer information, and the sender printer of this printer information will be respectively termed "target printer information", "target printer ID", and "target printer".

In S210, the CPU 132 determines whether or not the order flag of the drum order information (hereinbelow termed "drum order flag") associated with the target printer ID in the management table 140 (see FIG. 1) is OFF. The CPU 132 proceeds to S220 in a case of determining that the drum order flag is OFF (YES in S210), while it proceeds to S230 in a case of determining that the drum order flag is ON (NO in S210).

In S220, the CPU 132 determines whether or not the drum print number in the target printer information is no less than a threshold Dth1. The threshold Dth1 here is the same as the threshold Dth1 used in S110 of FIG. 3. The CPU 132 proceeds to S222 in a case of determining that the drum print number is equal to or greater than the threshold Dth1 (YES in S220), while it proceeds to S250 in a case of determining that the drum print number is less than the threshold Dth1 (NO in S220).

In S222, the CPU 132 sends to the delivery server 200 order information for instructing delivery of a drum. This order information includes the customer information associated with the target printer ID in the management table 140 and photoconductive drum information (e.g., a model number of drum). Due to this, the delivery of a new drum to the address indicated by the customer information is arranged by the delivery server 200. The CPU 132 receives an order ID from the delivery server 200 in response to sending the order information to the delivery server 200.

In S224, the CPU 132 updates the management table 140. Specifically, the CPU 132 changes the drum order flag from OFF to ON and further stores the order ID received in S222 as the order ID of the drum order information associated with the target printer ID. When S224 is completed, the CPU 132 proceeds to S250.

In S230, the CPU 132 determines whether or not the drum print number included in the target printer information is less than the threshold Dth1. That is, the CPU 132 determines whether or not the drum print number has changed from being equal to or greater than the threshold Dth1 (YES in S220) to being less than the threshold Dth1. Determination of YES in S230 is caused by S12 being executed following S22 or S32 of FIG. 2. The CPU 132 proceeds to S232 in a case of determining that the drum print number is less than the threshold Dth1 (YES in S230), while it proceeds to S240 in a case of determining that the drum print number is equal to or greater than the threshold Dth1 (NO in S230).

In S232, the CPU 132 updates the management table 140. Specifically, the CPU 132 changes the drum order flag from ON to OFF and further deletes the order ID of the drum order information associated with the target printer ID. When S232 is completed, the CPU 132 proceeds to S250.

In S240, the CPU 132 obtains delivery status information. Specifically, the CPU 132 firstly identifies the order ID included in the drum order information associated with the target printer ID from the management table 140. Then, the CPU 132 sends a status request including the identified order ID to the delivery server 200. In response to this, the CPU 132 receives from the delivery server 200 delivery status information indicating a delivery status of the drum identified by the order ID. This delivery status information indicates either one of "processing" meaning that the order for the delivery of the drum has been accepted but the delivery of the drum is not yet completed, or "delivery completed" meaning that the delivery of the drum has been completed.

In S242, the CPU 132 determines whether or not the delivery status information received in S240 indicates "delivery completed". The CPU 132 proceeds to S244 in a case of determining that the delivery status information indicates "delivery completed" (YES in S242), while it proceeds to S250 in a case of determining that the delivery status information indicates "processing" (NO in S242).

In S244, the CPU 132 determines whether or not the drum print number included in the target printer information is no less than a product obtained by multiplying 1.1 by a threshold Dth2. This threshold Dth2 used here is the same as the threshold Dth2 used in S130 of FIG. 3. The CPU 132 proceeds to S246 in a case of determining that the drum print number is equal to or greater than the aforementioned product (YES in S244), while it proceeds to S250 in a case of determining that the drum print number is less than the aforementioned product (NO in S244).

In S246, the CPU 132 sends an initialization instruction instructing initialization of the drum print number to the target printer. As a result, the drum print number is initialized by the target printer (see S22 of FIG. 2). When S246 is completed, the CPU 132 proceeds to S232.

In S250, the CPU 132 determines whether or not the order flag of the CTG order information (hereinbelow termed "CTG order flag") associated with the target printer ID in the management table 140 (see FIG. 1) is OFF. The CPU 132 proceeds to S260 in a case of determining that the CTG order flag is OFF (YES in S250), while it proceeds to S270 in a case of determining that the CTG order flag is ON (NO in S250).

In S260, the CPU 132 determines whether or not the toner remaining amount in the target printer information is no greater than a threshold Tth1. This threshold Tth1 used here is the same as the threshold Tth1 used in S160 of FIG. 3. The CPU 132 proceeds to S262 in a case of determining that the toner remaining amount is equal to or less than the threshold Tth1 (YES in S260), while it returns to S200 in a case of determining that the toner remaining amount is greater than the threshold Tth1 (NO in S260).

In S262, the CPU 132 sends to the delivery server 200 order information for instructing delivery of a CTG. This order information includes the customer information associated with the target printer ID in the management table 140 and CTG information (e.g., a model number of CTG). Due to this, the delivery of a new CTG to the address indicated by the customer information is arranged by the delivery server 200. The CPU 132 receives an order ID from the delivery server 200 in response to sending the order information to the delivery server 200.

In S264, the CPU 132 updates the management table 140. Specifically, the CPU 132 changes the CTG order flag from OFF to ON and further stores the order ID received in S262 as the order ID of the CTG order information associated with the target printer ID. When S264 is completed, the CPU 132 returns to S200.

In S270, the CPU 132 determines whether or not the toner remaining amount included in the target printer information is greater than the threshold Tth1. That is, the CPU 132 determines whether or not the toner remaining amount has changed from being equal to or less than the threshold Tth1 (YES in S260) to being greater than the threshold Tth1. Determination of YES in S270 is caused by S12 being executed following S42 of FIG. 2. The CPU 132 proceeds to S272 in a case of determining that the toner remaining amount is greater than the threshold Tth1 (YES in S270), while it returns to S200 in a case of determining that the toner remaining amount is equal to or less than the threshold Tth1 (NO in S270).

In S272, the CPU 132 updates the management table 140. Specifically, the CPU 132 changes the CTG order flag from ON to OFF and further deletes the order ID of the CTG order information associated with the target printer ID. When S272 is completed, the CPU 132 returns to S200.

Figure 5:
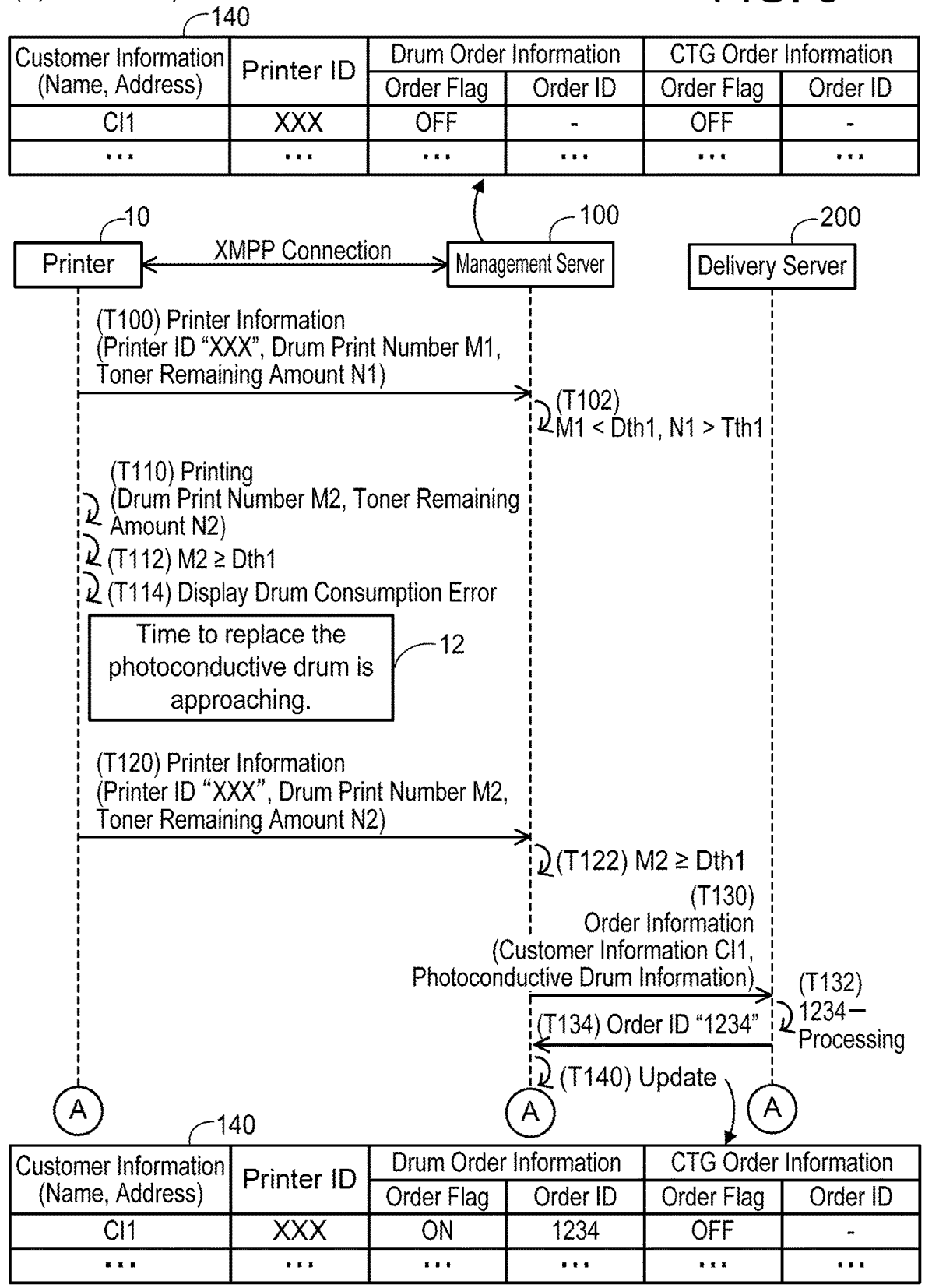
FIG. 5 shows a sequence diagram for delivery of a photoconductive drum.

(Specific Case: FIG. 5)

Next, a specific case realized by the processes of FIGS. 2 to 4 will be described with reference to FIG. 5. In an initial state of FIG. 5, each of the drum order flag and the CTG order flag associated with the printer ID "XXX" in the management table 140 of the management server 100 is OFF.

In T100, the printer 10 sends printer information to the management server 100 (YES in S10, S12 of FIG. 2). This printer information includes the printer ID "XXX", a drum print number M1, and a toner remaining amount N1.

When receiving the printer information from the printer 10 in T100 (YES in S200 of FIG. 4), the management server 100 determines that the drum print number M1 is less than the threshold Dth1 in T102 (YES in S210, NO in S220), and determines that the toner remaining amount N1 is greater than the threshold Tth1 (YES in S250, NO in S260). In this case, the management server 100 does not execute further processes (returns to S200 after determining NO in S260).

After this, the printer 10 executes printing in T110. As a result, the drum print number has become M2 (M2>M1) and the toner remaining amount has become N2 (N2<N1). Then, in T112, the printer 10 determines that the drum print number M2 is equal to or greater than the threshold Dth1 (NO in S100, YES in S110 of FIG. 3). In this case, the printer 10 displays the drum consumption error on the display unit 12 in T114 (S112). Due to this, the user can acknowledge that the drum does not have to be replaced immediately, but he/she needs to replace the drum soon. The toner remaining amount N2 remains greater than the threshold Tth1 (NO in S150, NO in S160).

After this, the printer 10 sends printer information to the management server 100 in T120 (YES in S10, S12 of FIG. 2). This printer information includes the printer ID "XXX", the drum print number M2, and the toner remaining amount N2.

When receiving the printer information from the printer 10 in T120 (YES in S200 of FIG. 4), the management server 100 determines in T122 that the drum print number M2 is equal to or greater than the threshold Dth1 (YES in S210, YES in S220). In this case, the management server 100 sends order information including customer information CI1 and photoconductive drum information to the delivery server 200 in T130 (S222). As above, the management server 100 can execute the process for delivering a new drum in the case where the drum print number M2 is equal to or greater than the threshold Dth1, that is, in the case where replacement time for the drum is approaching.

When receiving the order information from the management server 100 in T130, the delivery server 200 arranges the delivery of a drum and generates an order ID "1234". Then, in T132, the delivery server 200 stores the order ID "1234" and delivery status information "processing" in association with each other. Then, in T134, the delivery server 200 sends the order ID "1234" to the management server 100.

When receiving the order ID "1234" from the delivery server 200 in T134 (S222 of FIG. 4), the management server 100 updates the management table 140 in T140 (S224). Specifically, the drum order flag is changed from OFF to ON and the order ID "1234" is stored.

Figure 6:
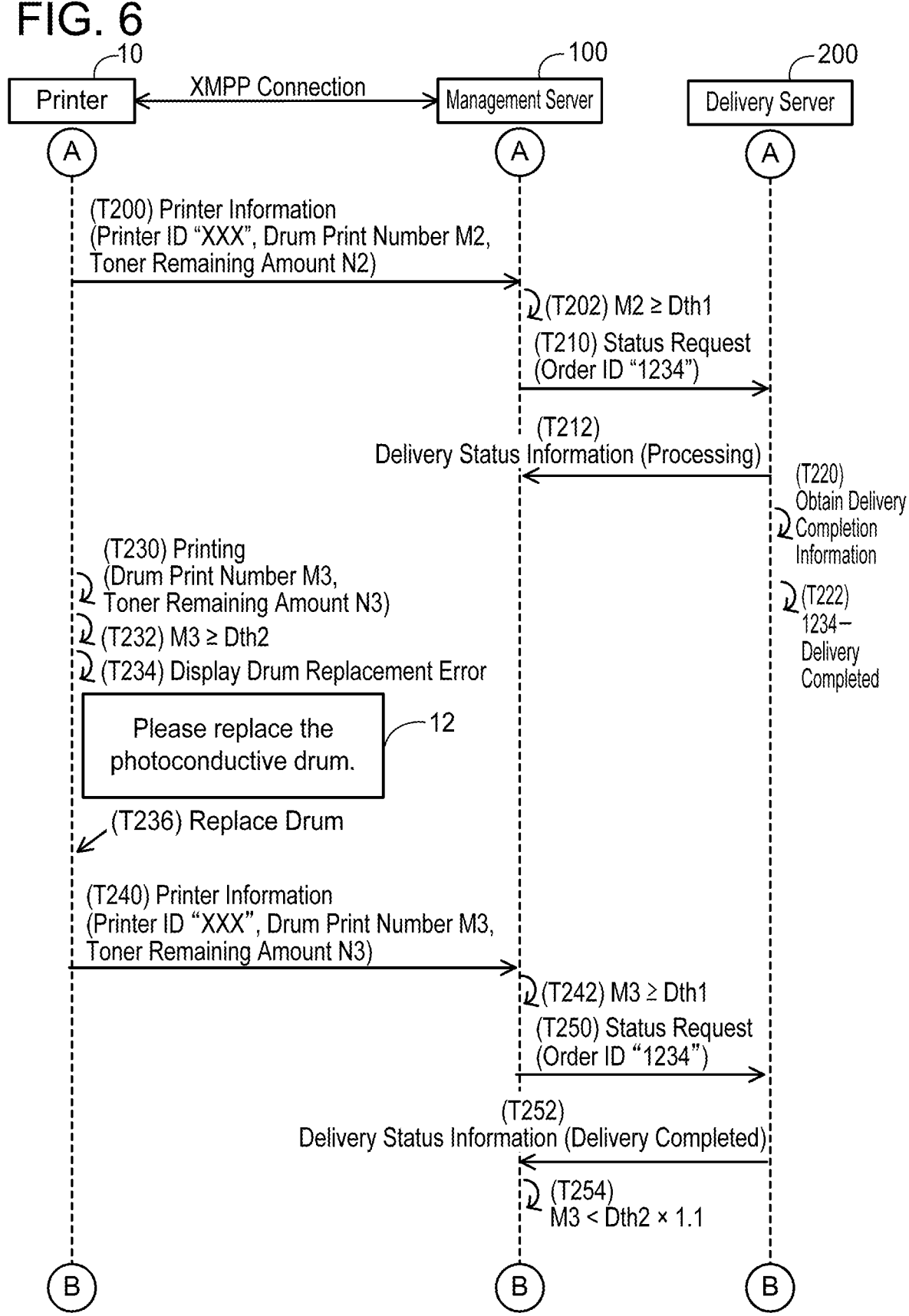
FIG. 6 shows a sequence diagram after the photoconductive drum has been delivered.

(Continuation of FIG. 5: FIG. 6)

Next, continuation of FIG. 5 will be described with reference to FIG. 6. In T200, the printer 10 sends printer information to the management server 100 (YES in S10, S12 of FIG. 2). This printer information is the same as the printer information in T120 of FIG. 5.

When receiving the printer information from the printer 10 in T200 (YES in S200 of FIG. 4), the management server 100 determines that the drum order flag is ON (see T140 of FIG. 5) (NO in S210), and determines in T202 that the drum print number M2 is equal to or greater than the threshold Dth1 (NO in S230). In this case, the management server 100 sends a status request including the order ID "1234" to the delivery server 200 in T210 (S240).

When receiving the status request from the management server 100 in T210, the delivery server 200 sends delivery status information "processing" (see T132 of FIG. 5) associated with the order ID "1234" included in the status request to the management server 100 in T212.

When receiving the delivery status information "processing" from the delivery server 200 in T212 (S240 of FIG. 4), the management server 100 determines that the delivery status information is not "delivery completed" and thus does not execute further processes (returns to S200 after determining NO in S242). That is, in this case, the initialization instruction is not sent to the printer 10. Due to this, initialization of the drum print number in the printer 10 before the delivery of the new drum is completed, that is, before the new drum is attached to the printer 10 can be prevented.

After this, in T220, the delivery server 200 obtains delivery completion information. The delivery completion information indicates that the delivery of the new drum according to the order information in T130 of FIG. 5 has been completed. In this case, the delivery server 200 stores the order ID "1234" and the delivery status information "delivery completed" in association with each other in T222.

After this, the printer 10 executes printing in T230. As a result, the drum print number has become M3 (M3>M2) and the toner remaining amount has become N3 (N3<N2). Then, in T232, the printer 10 determines that the drum print number M3 is equal to or greater than the threshold Dth3 (YES in S130 of FIG. 3). In this case, the printer 10 displays the drum replacement error instead of the drum consumption error on the display unit 12 in T234 (S132). Due to this, the user can acknowledge that the drum should be replaced immediately. The toner remaining amount N3 remains greater than the threshold Tth1 (NO in S150, NO in S160).

In T236, the user detaches the old drum from the printer 10 and attaches the new drum to the printer 10. However, even when the drum has been replaced, the drum print number is not automatically initialized and thus remains at M3.

After this, in T240, the printer 10 sends printer information to the management server 100 (YES in S10, S12 of FIG. 2). This printer information includes the printer ID "XXX", the drum print number M3, and the toner remaining amount N3.

Processes of T242 and T250 executed by the management server 100 are similar to the processes of T202 and T210 except that the drum print number M3 is used. When receiving the status request from the management server 100 in T250, the delivery server 200 sends the delivery status information "delivery completed" associated with the order ID "1234" included in the status request (see T222) to the management server 100 in T252.

When receiving the delivery status information "delivery completed" from the delivery server 200 in T252 (S240 of FIG. 4), the management server 100 determines that the delivery status information is "delivery completed" (YES in S242). However, the management server 100 determines that the drum print number M3 is less than the product obtained by multiplying 1.1 by the threshold Dth2 and thus does not execute further processes (returns to S200 after determining NO in S244). That is, in this case, the initialization instruction is not sent to the printer 10. Since the drum may not be replaced immediately in the printer 10 even when the drum print number M3 is equal to or greater than the threshold Dth2, the initialization instruction is not sent to the printer 10 when the drum print number M3 is less than the aforementioned product in the present embodiment. As above, initialization of the drum print number in the printer 10 can be prevented when there is a possibility that the new drum is not yet attached to the printer 10.

Figure 7:
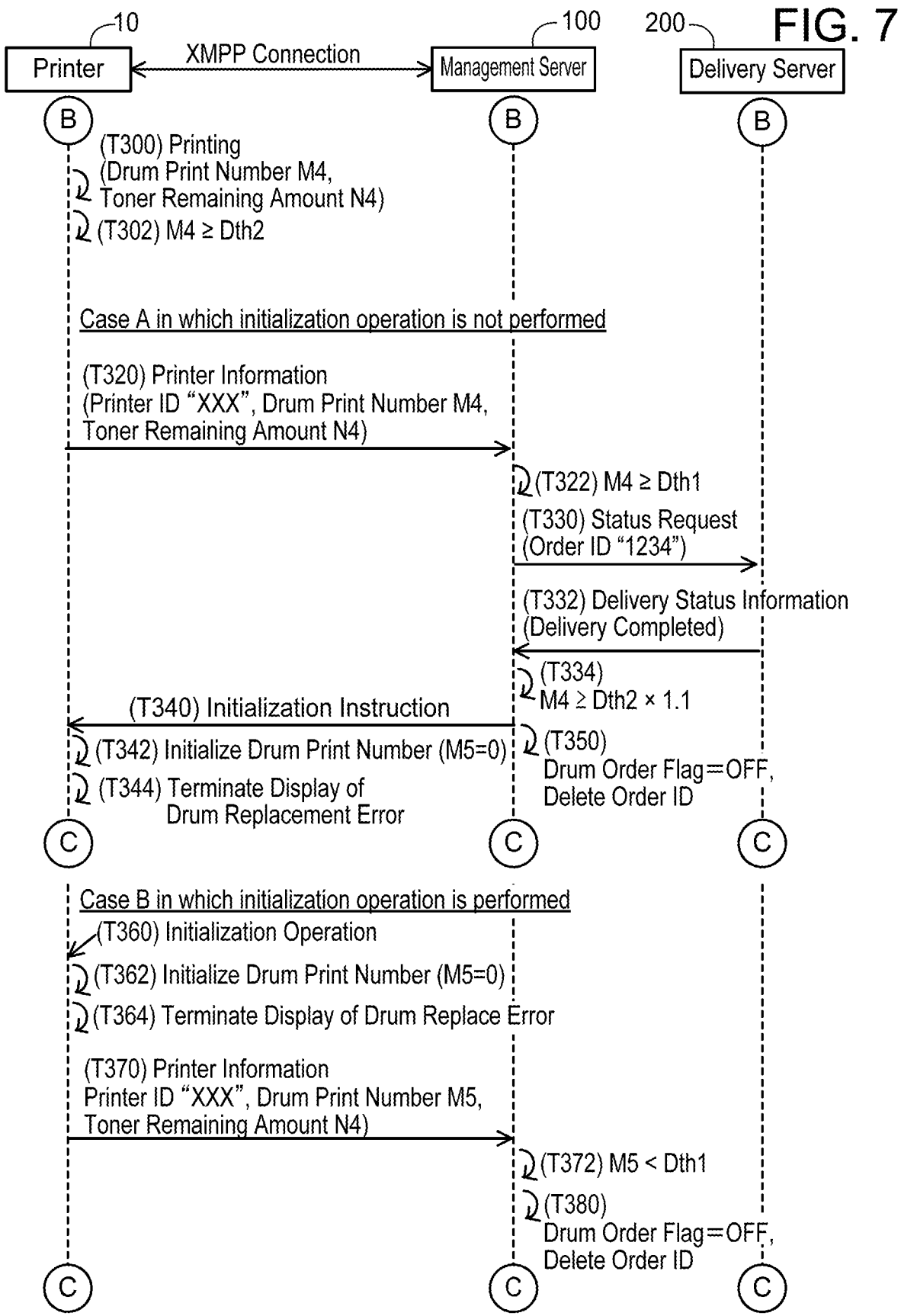
FIG. 7 shows a sequence diagram of Case A in which an initialization operation is not performed and Case B in which the initialization operation is performed.

(Continuation of FIG. 6: FIG. 7)

Next, continuation of FIG. 6 will be described with reference to FIG. 7. In T300, the printer 10 executes printing. As a result, the drum print number has become M4 (M4>M3) and the toner remaining amount has become N4 (N4<N3). Then, in T302, the printer 10 determines that the drum print number M4 is equal to or greater than the threshold Dth2 (NO in S120, NO in S140 of FIG. 3). In this case, the printer 10 continues to display the drum replacement error despite the drum having been replaced (see T236 of FIG. 6). Hereinbelow, Case A in which the initialization operation is not performed by the user on the printer 10 and Case B in which the initialization operation is performed by the user on the printer 10 will be described sequentially.

In Case A, the printer 10 sends printer information to the management server 100 in T320 (YES in S10, S12 of FIG. 2). This printer information includes the printer ID "XXX", the drum print number M4, and the toner remaining amount N4.

Processes of T322 to T332 executed by the management server 100 are similar to the processes of T242 to T252 of FIG. 6 except that the drum print number M4 is used. The management server 100 determines that the delivery status information is "delivery completed" (YES in S242), and determines that the drum print number M4 is equal to or greater than the aforementioned product in T334 (YES in S244). In this case, the management server 100 sends the initialization instruction to the printer 10 using the XMPP connection in T340 (S246). As above, the management server 100 can initialize the drum print number stored in the printer 10 when the delivery of the new drum has been completed and the new drum has highly likely been attached to the printer 10 (i.e., when the drum print number M4 is equal to or greater than the aforementioned product).

When receiving the initialization instruction from the management server 100 in T340 (YES in S20 of FIG. 2), the printer 10 initializes the drum print number in T342 (S22). Specifically, the drum print number becomes M5 (M5=zero). Then, the printer 10 determines that the drum print number M5 is less than the threshold Dth1 (YES in S140 of FIG. 3) and terminates the display of the drum replacement error in T344 (S142). As above, it can be prevented that the drum replacement error continues to be displayed despite the drum having been replaced.

When sending the initialization instruction to the printer 10 in T340, the management server 100 updates the management table 140 in T350 (S232 following S246 of FIG. 4).

In Case B, the user performs the initialization operation on the printer 10 in T360 after having replaced the drum (see T236 of FIG. 6). In this case, the printer 10 initializes the drum print number in T362 (YES in S30, S32 of FIG. 2). Specifically, the drum print number becomes M5 (M5=zero). As above, the printer 10 can suitably initialize the drum print number in the case of accepting the initialization operation from the user before receiving the initialization instruction from the server 100. Then, the printer 10 determines that the drum print number M5 is less than the threshold Dth1 (YES in S140 of FIG. 3) and terminates the display of the drum replacement error in T364 (S142).

After this, the printer 10 sends printer information to the management server 100 in T370 (YES in S10, S12 of FIG. 2). This printer information includes the printer ID "XXX", the drum print number M5 (i.e., zero), and the toner remaining amount N4.

When receiving the printer information from the printer 10 in T370 (YES in S200 of FIG. 4), the management server 100 determines that the drum print number M5 is less than the threshold Dth1 in T372 (YES in S230). In this case, the management server 100 updates the management table 140 in T380 (S232 following determination of YES in S230).

Figure 8:
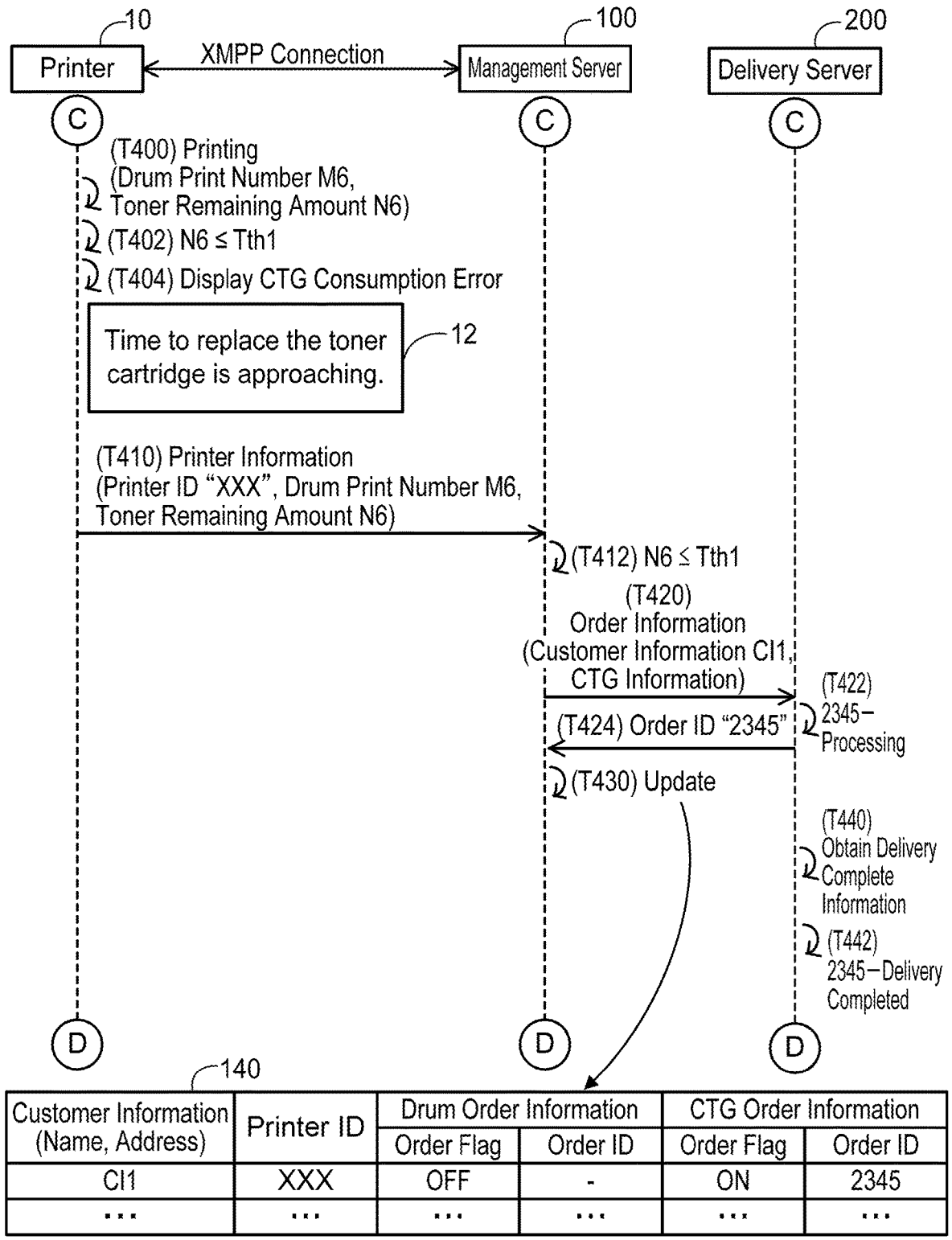
FIG. 8 shows a sequence diagram for delivery of a toner cartridge.

(Continuation of FIG. 7: FIG. 8)

Next, continuation of FIG. 7 will be described with reference to FIG. 8. In T400, the printer 10 executes printing. As a result, the drum print number has become M6 (M6≈zero) and the toner remaining amount has become N6 (N6<N4). Then, in T402, the printer 10 determines that the toner remaining amount N6 is equal to or less than the threshold Tth1 (NO in S150, YES in S160 of FIG. 3). In this case, the printer 10 displays the CTG consumption error on the display unit 12 in T404 (S162). Due to this, the user can acknowledge that the CTG does not have to be replaced immediately, but he/she needs to replace the CTG soon. The drum print number M6 remains less than the threshold Dth1 (NO in S100, NO in S110).

Then, in T410, the printer 10 sends printer information to the management server 100 (YES in S10, S12 of FIG. 2). This printer information includes the printer ID "XXX", the drum print number M6, and the toner remaining amount N6.

When receiving the printer information from the printer 10 in T410 (YES in S200 of FIG. 4), the management server 100 determines that the toner remaining amount N6 is equal to or less than the threshold Tth1 in T412 (YES in S250, YES in S260). In this case, the management server 100 sends order information including the customer information CI1 and CTG information to the deliver server 200 in T420 (S262). As above, the management server 100 can execute the process for delivering a new CTG when the toner remaining amount N6 is equal to or less than the threshold Tth1, that is, when replacement time for the CTG is approaching.

Processes of T422 to T430 are similar to T132 to T140 of FIG. 5 except that the delivery of the new CTG is arranged, an order ID "2345" is generated, and the CTG order information is updated. Further, processes of T440 and T442 are similar to T220 and T222 of FIG. 6 except that the delivery of the new CTG is completed.

Figure 9:
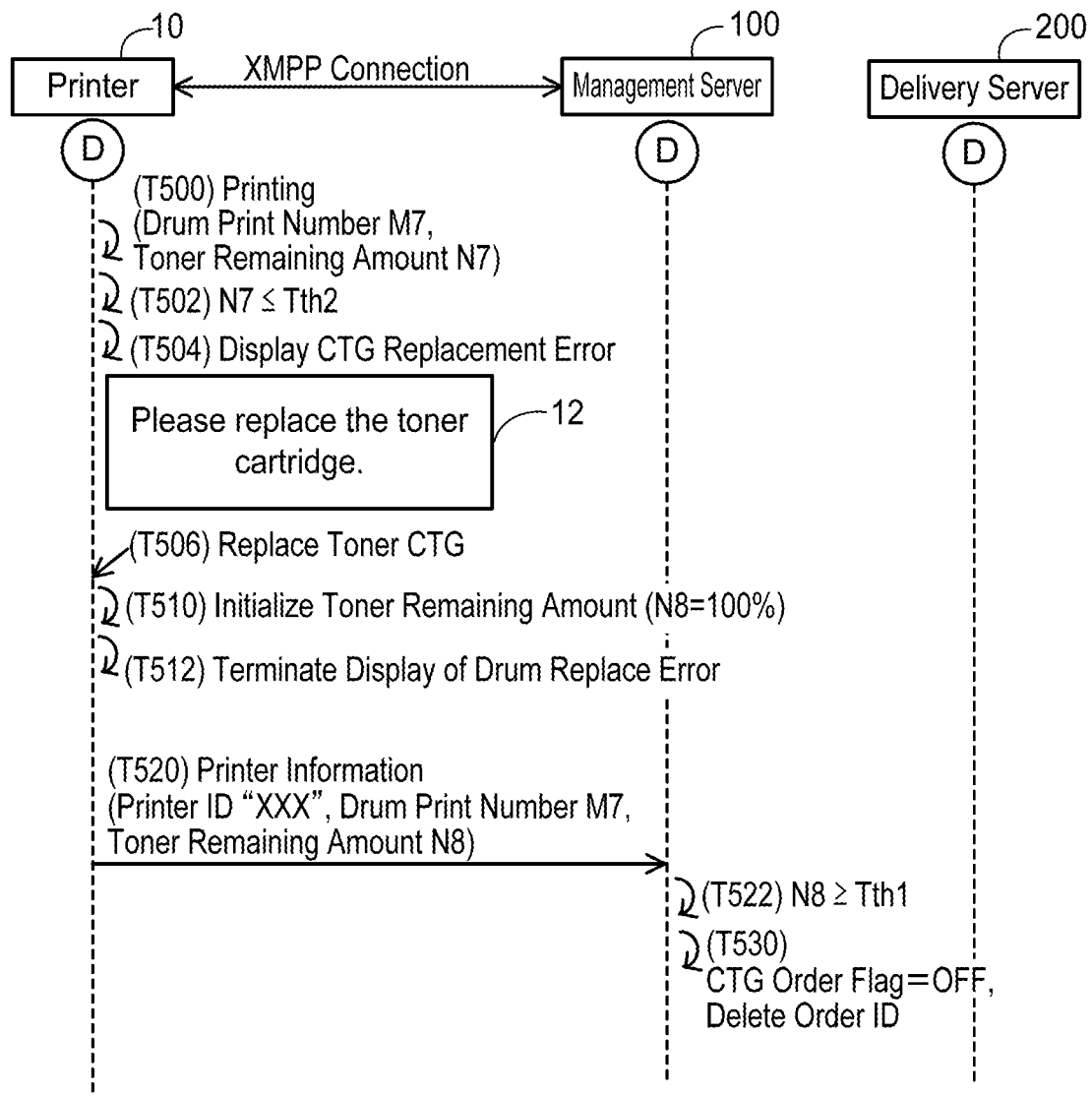
FIG. 9 shows a sequence diagram after the toner cartridge has been delivered.

(Continuation of FIG. 8: FIG. 9)

Next, continuation of FIG. 8 will be described with reference to FIG. 9. In T500, the printer 10 executes printing. As a result, the drum print number has become M7 (M7>M6) and the toner remaining amount has become N7 (N7<N6). Then, in T502, the printer 10 determines that the toner remaining amount N7 is equal to or less than the threshold Tth2 (YES in S170, YES in S180 of FIG. 3). In this case, the printer 10 displays the CTG replacement error on the display unit 12 in T504 (S182). Due to this, the user can acknowledge that the CTG should be replaced immediately. The drum print number M7 remains less than the threshold Dth1 (NO to S100, NO in S110).

In T506, the user detaches the old CTG from the printer 10 and attaches the new CTG to the printer 10. In this case, the printer 10 initializes the toner remaining amount in T510 (YES in S40, S42 of FIG. 2). Specifically, the toner remaining amount becomes N8 (N8=100%). Then, the printer 10 determines that the toner remaining amount N8 is greater than the threshold Tth1 (YES in S190 of FIG. 3) and terminates the display of the CTG replacement error in T512 (S192).

After this, the printer 10 sends printer information to the management server 100 in T520 (YES in S10, S12 of FIG. 2). This printer information includes the printer ID "XXX", the drum print number M7, and the toner remaining amount N8 (i.e., "100%").

When receiving the printer information from the printer 10 in T520 (YES in S200 of FIG. 4), the management server 100 determines in T522 that the toner remaining amount N8 is greater than the threshold Tth1 (YES in S270). In this case, the management server 100 updates the management table 140 in T530 (S272).

(Effects of Present Embodiment)

According to the present embodiment, the management server 100 sends the initialization instruction to the printer 10 (T340 of FIG. 7) in the case of executing the process for delivering a new drum (T130 of FIG. 5). As a result, the drum print number stored in the printer 10 is initialized (T342). As above, the management server 100 can initialize the drum print number stored in the printer 10 by using a novel method. Due to this, occurrence of problems that could be caused due to the drum print number stored in the printer 10 not being initialized can be prevented. These problems include, for example, that the drum replacement error continues to be displayed on the printer 10, that determination on the delivery based on the drum print number (i.e., the determination in S220 of FIG. 4) cannot be executed suitably, and the like.

(Corresponding Relationships)

The management server 100 and the printer 10 are respectively examples of "server" and "printer". The drum and the CTG respectively examples of "first consumable article" and "second consumable article". The drum print number and the toner remaining amount respectively examples of "first count information" and "second count information". Determination of YES in S200 and YES in S220 of FIG. 4 is an example of "the first predetermined condition is satisfied". Determination of YES in S200 and YES in S260 of FIG. 4 is an example of "the second predetermined condition is satisfied". Sending of the order information in S222 and sending of the order information in S262 of FIG. 4 are respectively examples of "first delivering process" and "second delivering process". The threshold Dth1 and the threshold Dth2 are respectively examples of "first threshold" and "fourth threshold". The product obtained by multiplying 1.1 by the threshold Dth2 is an example of "second threshold". (100−toner remaining amount)% and (100−Tth1)% are respectively examples of "used amount of the second consumable article" and "third threshold". The delivery status information and "delivery completed" are respectively examples of "status information" and "predetermined status". The drum consumption error and the drum replacement error are respectively examples of "first notification information" and "second notification information".

S200 of FIG. 4 is an example of "receive the first count information" and "receive the second count information". S220, S222, S260, and S262 are respectively examples of "determine that the first predetermined condition is satisfied", "execute a first delivering process", "determine that the second predetermined condition is satisfied", and "execute a second delivering process". S240 and S246 are respectively examples of "obtain status information" and "send an initialization instruction".

S12 of FIG. 2 is an example of "send the first count information" and "send the second count information". S20 and S22 are respectively examples of "receive an initialization instruction" and "in a case where the initialization instruction is received from the server, initialize the first count information". S30, S32, and S42 are respectively examples of "accept an initialization operation", "in a case where the initialization operation is accepted before the initialization instruction is received from the server and after the new first consumable article has been attached to the printer, initialize the first count information", and "automatically initialize the second count information". S112, S132, and S142 of FIG. 3 are respectively examples of "cause the display unit to display second notification information", "cause the display unit to display first notification information", and "terminate display of the first notification information".

(Variant 1) The management server 100 may be realized by multiple separate servers. For example, the management server 100 may include a first server configured to execute the processes of S200 to S232 and a second server configured to execute processes of S240 to S246 among the processes of S200 to S246 of FIG. 4 related to drum management. In general terms, "a server configured to execute communication with a printer" may be configured of one or more servers.

(Variant 2) The management server 100 may also serve as the delivery server 200. In this case, in S222 and S262 of FIG. 4, the management server 100 arranges the delivery of the consumable article (i.e., instructs the worker to do so) instead of sending the order information, and generates the order ID. Further, the management server 100 may store delivery status information in the memory 134 and may obtain the delivery status information from the memory in S240. In this variant, arranging the delivery of the consumable article is an example of "first (or second) delivering process". Further, obtaining the delivery status information from the memory 134 is an example of "obtain status information".

(Variant 3) The "first consumable article" is not limited to the photoconductive drum, but may be a fixing unit configured to fix the toner transferred to a print medium from the photoconductive drum on the print medium, a transport unit (e.g., sheet feeder, belt unit) configured to transport a print medium, or the like. Especially, in a case where the "first consumable article" is a transport unit, the "printer" may not be a laser printer but may be an inkjet printer. Further, the "second consumable article" may not be the toner cartridge, and may be a photoconductive drum, a fixing unit, a transport unit, an ink cartridge, or the like.

(Variant 4) The "first (or second) count information" may be information corresponding to the type of the consumable article, and may, for example, be a number of sheets that will be able to be printed using the consumable article, a rotary speed of the photoconductive drum, a number of times print medium was transported, time elapsed since the consumable article was attached, a used amount of the toner, a remaining amount of ink, a used amount of ink, or the like.

(Variant 5) The printer 10 may not send the drum print number nor the toner remaining amount to the management server 100. In this case, the printer 10 may send drum order information for requesting delivery of a drum to the management server 100 when the drum print number becomes equal to or greater than the threshold Dth1, and may send CTG order information for requesting delivery of a CTG when the toner remaining amount becomes equal to or less than the threshold Tth1. In a case of receiving the order information from the printer 10, the management server 100 sends the order information to the delivery server 200. Further, in a case of receiving the drum order information from the printer 10, the management server 100 sends the initialization instruction to the printer 10. In this variant, receiving the drum order information from the printer 10 and receiving the CTG order information from the printer 10 are respectively examples of "first predetermined condition" and "second predetermined condition". Further, in the present variant, "receive the first count information", "determine that the first predetermined condition is satisfied", "receive the second count information", and "determine that the first predetermined condition is satisfied" may be omitted.

(Variant 6) S244 of FIG. 4 may be omitted. In general terms, in the case where the first delivering process is executed, "send the initialization instruction" may include sending the initialization instruction to the printer even if the used amount of the first consumable article is less than the second threshold.

(Variant 7) S240 and S242 of FIG. 4 may be omitted. In this variant, "obtain status information" may be omitted. In general terms, in the case where the first delivering process is executed, "send the initialization instruction" may include sending the initialization instruction to the printer even if the delivery status is not the predetermined status.

(Variant 8) The delivery status information is not limited to the two values "processing" and "delivery completed", and may include three values "order accepted", "delivery in progress", and "delivery completed". Further, the delivery status information may not include "delivery completed", and may include two values "order accepted" and "delivery in progress, for example.

(Variant 9) In S12 of FIG. 2, the printer 10 may send printer information that does not include the toner remaining amount to the management server 100. Further, S40 and S42 may be omitted. In this case, S250 to S272 of FIG. 4 may be omitted as well. In this variant, "execute a second delivering process", "receive the second count information", and "determine that the second predetermined condition is satisfied" may be omitted. Further, "automatically initialize the second count information" and "send the second count information" may be omitted.

(Variant 10) The printer 10 may not have two thresholds Dth1 nor Dth2 for the drum, and may not execute S120 to S132 of FIG. 3, for example. In this variant, the drum consumption error is an example of "first notification information". Further, "cause the display unit to display second notification information" may be omitted.

(Variant 11) The printer 10 may not display the drum consumption error nor the drum replacement error. In this case, the user can acknowledge that the drum should be replaced when a new drum is delivered. In this variant, "cause the display unit to display first notification information" and "cause the display unit to display second notification information" may be omitted.

(Variant 12) S30 and S32 of FIG. 2 may be omitted. In this variant, "accept an initialization operation" and "automatically initialize the second count information" may be omitted.

(Variant 13) In the embodiments as above, the processes of FIGS. 2 to 9 are realized by the CPU 32 of the printer 10 executing the program 36 (i.e., software) and the CPU 132 of the management server 100 executing the program 136. Alternatively, at least one of the processes may be realized by hardware such as a logic circuit.

What is claimed is:

1. A sever configured to execute communication with a printer, the server comprising:
a controller,
wherein the controller is configured to:
in a case where a first predetermined condition is satisfied, execute a first delivering process for delivering a new first consumable article to a user of the printer; and
in a case where the first delivering process is executed, send an initialization instruction to the printer, wherein the initialization instruction is a command instructing the printer to initialize first count information, wherein the first count information is stored in the printer and related to a used amount of a first consumable article.

2. The server as in claim 1, wherein
the controller is further configured to:
receive the first count information stored in the printer from the printer; and
in a case where the first count information is received from the printer and the used amount of the first consumable article indicated by the first count information is equal to or greater than a first threshold, determine that the first predetermined condition is satisfied.

3. The server as in claim 2, wherein
the first count information is re-received from the printer after the first delivering process has been executed,
in a case where the first delivering process has been executed and the used amount of the first consumable article indicated by the re-received first count information is equal to or greater than a second threshold that is larger than the first threshold, the controller sends the initialization instruction to the printer, and
in a case where the first delivering process has been executed and the used amount of the first consumable article indicated by the re-received first count information is less than the second threshold, the initialization instruction is not sent to the printer.

4. The server as in claim 1, wherein
the controller is further configured to:
after the first delivering process has been executed, obtain status information that indicates a delivery status of the new first consumable article,
wherein in a case where the first delivering process has been executed and the status information indicates a predetermined status, the controller sends the initialization instruction to the printer, and
in a case where the first delivering process has been executed and the status information does not indicate the predetermined status, the initialization instruction is not sent to the printer.

5. The server as in claim 4, wherein the predetermined status is completion of delivery of the new first consumable article.

6. The server as in claim 1, wherein
the printer further stores second count information related to a used amount of a second consumable article different from the first consumable article, and
the controller is further configured to:
in a case where a second predetermined condition is satisfied, execute a second delivering process for delivering a new second consumable article to the user of the printer,
wherein an instruction for initializing the second count information stored in the printer is not sent to the printer in response to the second delivering process being executed,
the new first consumable article is a consumable article of which attachment to the printer does not cause the printer to automatically initialize the first count information, and
the new second consumable article is a consumable article of which attachment to the printer causes the printer to automatically initialize the second count information.

7. The server as in claim 6, wherein
the controller is further configured to:
receive the second count information stored in the printer from the printer; and
in a case where the second count information is received from the printer and the used amount of the second consumable article indicated by the second count information is equal to or greater than a third threshold, determine that the second predetermined condition is satisfied.

8. A non-transitory computer-readable recording medium storing computer-readable instructions for a server configured to execute communication with a printer, wherein the computer-readable instructions, when executed by a processor of the server, cause the server to:
in a case where a first predetermined condition is satisfied, execute a first delivering process for delivering a new first consumable article to a user of the printer; and
in a case where the first delivering process is executed, send an initialization instruction to the printer, wherein the initialization instruction is a command instructing the printer to initialize first count information, wherein the first count information is stored in the printer and related to a used amount of a first consumable article.

9. A method performed by a sever configured to execute communication with a printer, the method comprising:
in a case where a first predetermined condition is satisfied, executing a first delivering process for delivering a new first consumable article to a user of the printer; and
in a case where the first delivering process is executed, sending an initialization instruction to the printer, wherein the initialization instruction is a command instructing the printer to initialize first count information, wherein the first count information is stored in the printer and related to a used amount of a first consumable article.

10. The method performed by the server as in claim 9, the method further comprising:
receiving the first count information stored in the printer from the printer; and
in a case where the first count information is received from the printer and the used amount of the first consumable article indicated by the first count information is equal to or greater than a first threshold, determining that the first predetermined condition is satisfied.

11. The method performed by the server as in claim 10, wherein
the first count information is re-received from the printer after the first delivering process has been executed,
in a case where the first delivering process has been executed and the used amount of the first consumable article indicated by the re-received first count information is equal to or greater than a second threshold that is larger than the first threshold, the initialization instruction is sent to the printer, and
in a case where the first delivering process has been executed and the used amount of the first consumable article indicated by the re-received first count information is less than the second threshold, the initialization instruction is not sent to the printer.

12. The method performed by the server as in claim 9, the method further comprising:
after the first delivering process has been executed, obtaining status information that indicates a delivery status of the new first consumable article,
wherein in a case where the first delivering process has been executed and the status information indicates a predetermined status, the initialization instruction is sent to the printer, and
in a case where the first delivering process has been executed and the status information does not indicate the predetermined status, the initialization instruction is not sent to the printer.

13. The method performed by the server as in claim 12, wherein the predetermined status is completion of delivery of the new first consumable article.

14. A printer configured to execute communication with a server, the printer comprising:

a memory storing first count information related to a used amount of a first consumable article of the printer; and
a controller,
wherein the controller is configured to:
in a case where a first delivering process is executed by the server, receive an initialization instruction instructing initialization of the first count information from the server, wherein in the server, the first delivering process for delivering a new first consumable article to a user of the printer is executed in a case where a first predetermined condition is satisfied; and
in a case where the initialization instruction is received from the server, initialize the first count information in the memory.

15. The printer as in claim 14, wherein
the controller is further configured to:
send the first count information in the memory to the server,
wherein in the server, it is determined that the first predetermined condition is satisfied in a case where the first count information is received from the printer and the used amount of the first consumable article indicated by the first count information is equal to or greater than a first threshold.

16. The printer as in claim 15, further comprising a display unit,
wherein the controller is further configured to:
in a case where the used amount of the first consumable article indicated by the first count information in the memory changes from being less than a fourth threshold that is greater than the first threshold to being equal to or greater than the fourth threshold, cause the display unit to display first notification information indicating that the first consumable article is to be replaced; and
in a case where the first count information in the memory is initialized while the first notification information is displayed on the display unit, terminate display of the first notification information.

17. The printer as in claim 16, wherein
the controller is further configured to:
in a case where the used amount of the first consumable article indicated by the first count information in the memory changes from being less than the first threshold to being equal to or greater than the first threshold, cause the display unit to display second notification information indicating that a replacement timing for the first consumable article is approaching,
wherein in a case where the used amount of the first consumable article indicated by the first count information in the memory changes from being less than the fourth threshold to being equal to or greater than the fourth threshold while the second notification information is displayed on the display unit, the controller causes the display unit to display the first notification information instead of the second notification information.

18. The printer as in claim 14, wherein
the controller is further configured to:
accept an initialization operation for initializing the first count information; and
in a case where the initialization operation is accepted before the initialization instruction is received from the server and after the new first consumable article has been attached to the printer, initialize the first count information in the memory.

19. The printer as in claim 14, wherein
the memory further stores second count information related to a used amount of a second consumable article different from the first consumable article of the printer, and
in the server, a second delivering process for delivering a new second consumable article to the user of the printer is executed in a case where a second predetermined condition is satisfied,
wherein the controller is further configured to:
in a case where the new second consumable article is attached to the printer, automatically initialize the second count information in the memory without accepting an instruction for initializing the second count information in the memory,
wherein the new first consumable article is a consumable article of which attachment to the printer does not cause automatic initialization of the first count information.

20. The printer as in claim 19, wherein
the controller is further configured to:
send the second count information in the memory to the server,
wherein in the server, it is determined that the second predetermined condition is satisfied in a case where the second count information is received from the printer and a used amount of the second consumable article indicated by the second count information is equal to or greater than a third threshold.

* * * * *